United States Patent [19]
Stedman

[11] 4,141,601
[45] Feb. 27, 1979

[54] TRACK SHOE WITH RETAINING FLANGES

[75] Inventor: Robert N. Stedman, Chillicothe, Ill.

[73] Assignee: Caterpillar Tractor Co., Peoria, Ill.

[21] Appl. No.: 827,909

[22] Filed: Aug. 26, 1977

[51] Int. Cl.² .......................................... B62D 55/28
[52] U.S. Cl. ...................................................... 305/54
[58] Field of Search ............................ 305/51, 53–55, 305/35 R, 35 EB, 39–50, 60; 301/44 T; 74/247; 152/180, 182, 187, 199

[56] References Cited

U.S. PATENT DOCUMENTS

| | | | |
|---|---|---|---|
| 3,278,244 | 10/1966 | Deffenbaugh et al. | 305/54 |
| 3,390,924 | 7/1968 | Bumbaugh | 305/35 EB |
| 3,937,529 | 2/1976 | Becker et al. | 305/54 |

*Primary Examiner*—Robert B. Reeves
*Assistant Examiner*—John P. Shannon
*Attorney, Agent, or Firm*—Phillips, Moore, Weissenberger, Lempio & Majestic

[57] ABSTRACT

An endless track assembly comprises a plurality of track shoes pivotally interconnected by a link assembly secured thereto. The link assembly comprises a plurality of links, each releasably secured to one of the track shoes by a plurality of bolts. The track shoe comprises a lug disposed on each lateral side thereof and a pair of longitudinally spaced flanges releasably secured to the links by the bolts. In a first embodiment of this invention, the flanges are formed out of sidewalls of the track shoe to form an integral part thereof whereas in a second embodiment of this invention the flanges are formed on one component of a two-component track shoe.

36 Claims, 7 Drawing Figures

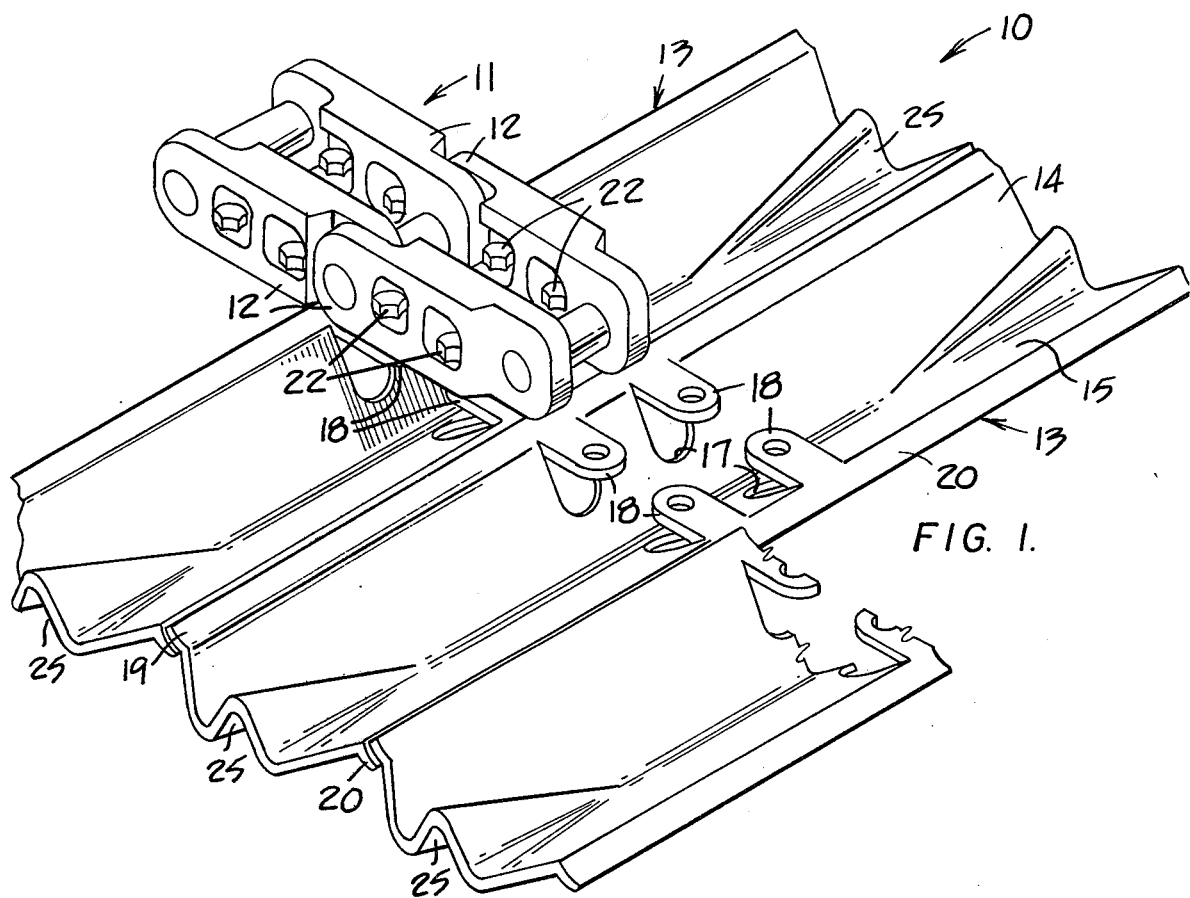
FIG. 1.
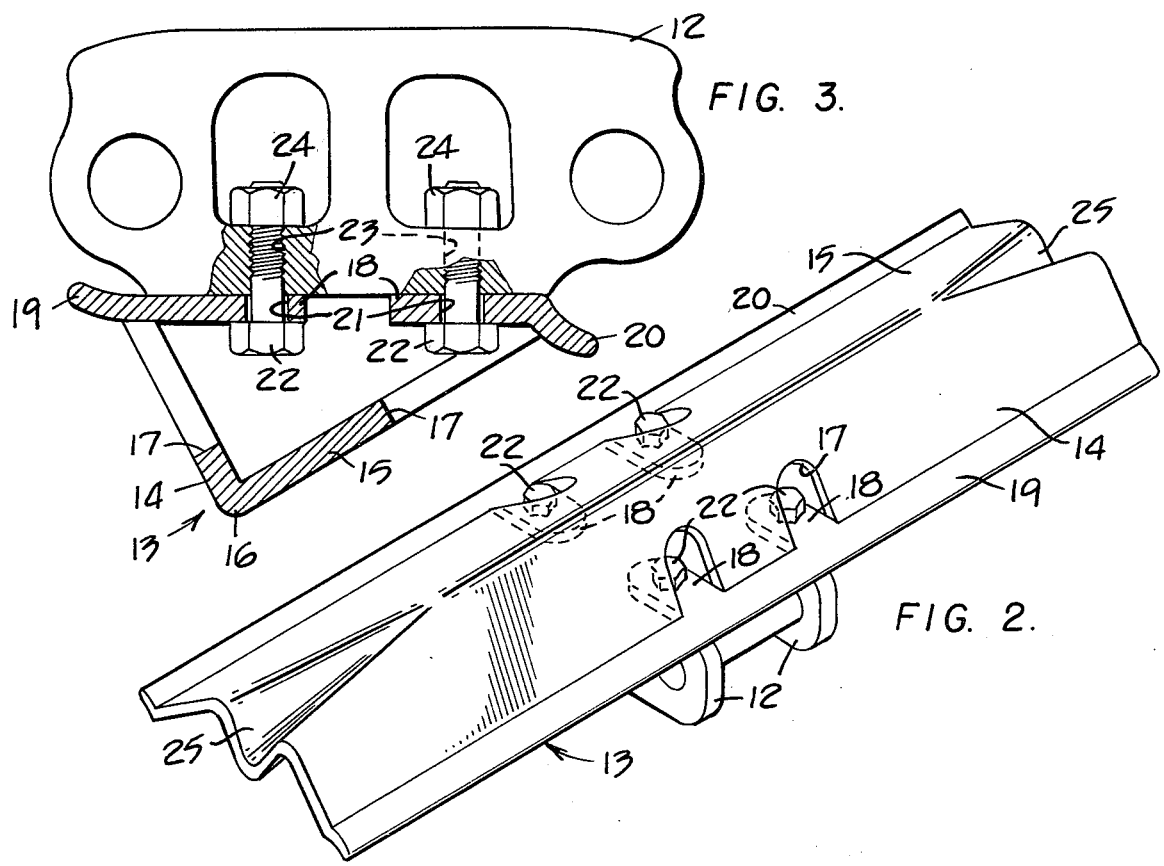
FIG. 3.
FIG. 2.

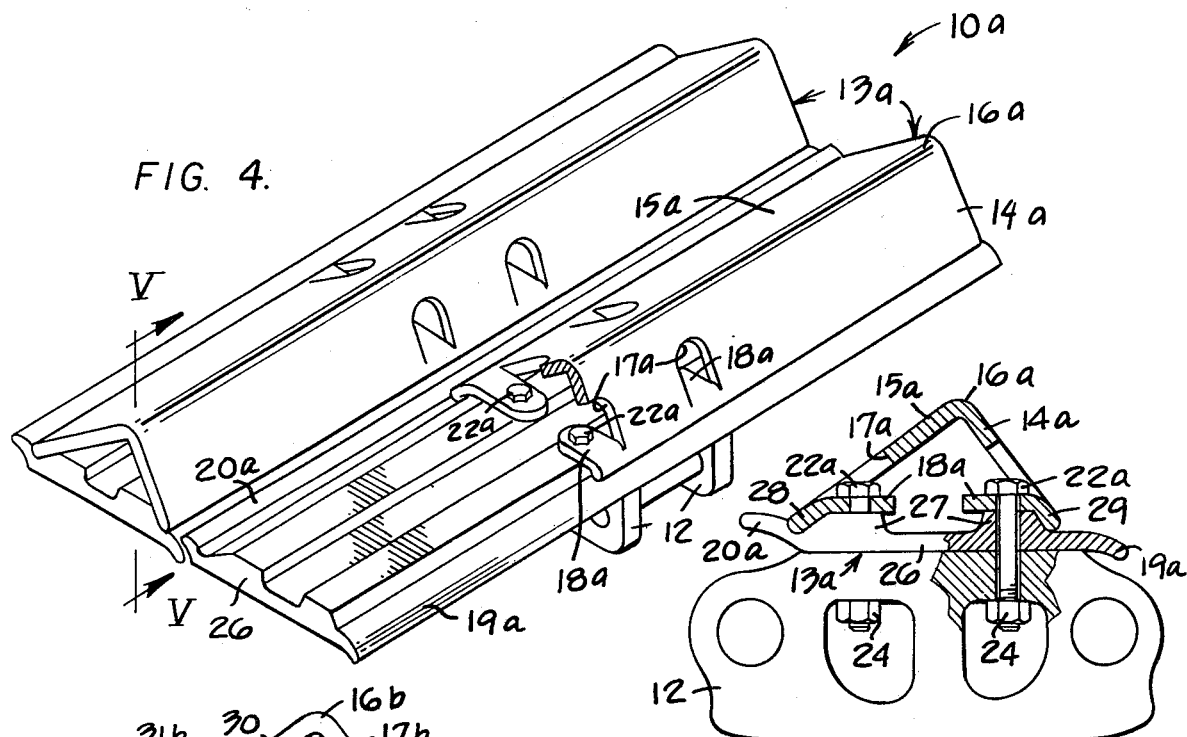
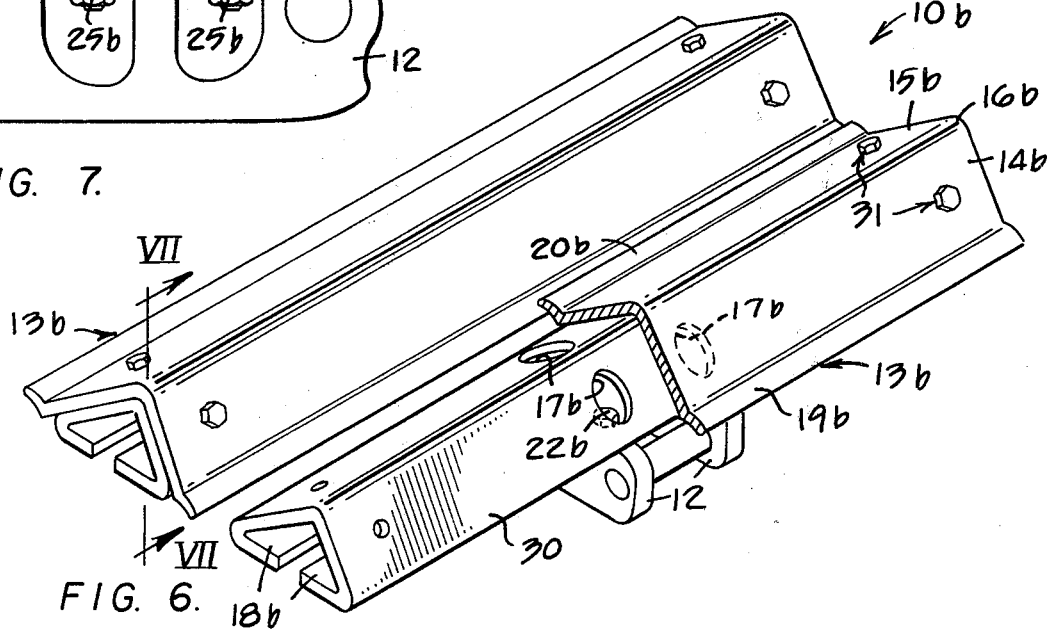

TRACK SHOE WITH RETAINING FLANGES

BACKGROUND OF THE INVENTION

The track shoes employed on track-type tractors must oftentimes traverse "soft" soils, such as peat and volcanic ash, which gives rise to flotation and traction problems. One approach to alleviating such problems is to lengthen the track shoes to thus provide substantial area contact and a low-pressure engagement with the ground. Typical track shoes of this type are disclosed in U.S. Pat. Nos. 3,937,529 and 4,005,912, both assigned to the assignee of this application. It has proven desirable to provide fastening means, securing each track shoe to a link assembly of the track assembly, which are readily accessible and substantially protected against damage upon operation of the track assembly.

SUMMARY OF THIS INVENTION

The present invention is directed to overcoming one or more of the problems as set forth above.

The improved track shoe of this invention comprises a pair of diverging sidewalls each terminating at a lug extending outwardly therefrom. At least one flange means is disposed adjacent to each lug and extends inwardly therefrom and inwardly from a respective one of the sidewalls. The flange means is adapted to be secured to a link of an endless track assembly of a track-type vehicle to thus secure the track shoe thereto. The track shoe may comprise a unitary or two-component construction, as exemplified by the embodiments of this invention hereinafter described.

BRIEF DESCRIPTION OF THE DRAWINGS

Other objects of this invention will become apparent from the following description and accompanying drawings wherein:

FIG. 1 partially illustrates an endless track assembly comprising a plurality of track shoes of this invention pivotally interconnected together by a link assembly;

FIG. 2 is a bottom plan view of one of the track shoes having a link of the link assembly secured thereto;

FIG. 3 is an enlarged transverse sectional view of the track shoe and link;

FIG. 4 is a partially sectioned bottom plan view of a modified track assembly;

FIG. 5 is a transverse sectional view, taken in the direction of arrows V—V in FIG. 4;

FIG. 6 is a view similar to FIG. 4, but illustrating a further modification of the track assembly; and FIG. 7 is a transverse sectional view, taken in the direction of arrows VII—VII in FIG. 6.

DETAILED DESCRIPTION

FIG. 1 partially illustrates an endless track assembly 10 comprising an articulated link assembly 11 having a plurality of links 12, each secured to a respective track shoe 13. As more clearly shown in FIGS. 2 and 3, each track shoe comprises a pair of sidewalls 14 and 15 having a generally V-shaped cross section. Sidewalls 14 and 15 diverge away from each other from a common apex 16 towards the base of the track shoe and a pair of longitudinally spaced openings 17 are formed in each sidewall.

Each opening is defined by a flange 18 which is suitably formed out of a respective sidewall to overlie a link 12. Sidewalls 14 and 15 terminate at their lower ends at lugs 19 and 20, respectively, with the lugs of each adjacent pair of track shoes functioning to continuously overlap each other during operation of the track assembly in a conventional manner. Each flange 18 is disposed adjacent to a respective lug and extends inwardly therefrom and from a respective sidewall, as more clearly shown in FIG. 3.

Each flange 18 has an aperture 21 formed therethrough for receiving the shank of a bolt 22 which further extends upwardly through an aperture 23 formed through a bridging portion of link 12. A nut 24 is threadably mounted on the bolt to provide fastening means securing the track shoe to the link assembly. If so desired, each lateral end of the track shoe may be formed with a trough-like crimp 25 to aid in stabilizing and increasing the tractive effort of the track shoe as well as reducing "plowing" when turning the vehicle.

FIGS. 4 and 5 illustrate a modified track assembly 10a wherein identical numerals depict corresponding constructions, but with numerals depicting modified constructions being accompanied by an "a".

Track assembly 10a comprises a plurality of two-component track shoes 13a each having a first component forming a pair of diverging sidewalls 14a and 15a meeting at a common apex 16a. A pair of openings 17a are formed through each sidewall to define bent flanges 18a extending inwardly therefrom. A second component or base 26 of the track shoe has lugs 19a and 20a formed on opposite ends thereof.

A pair of laterally spaced grousers 27 are formed on base 26 and a bolt 22a extends through a respective flange 18a, a grouser 27 and the base and through a bridging portion of track link 12. A nut 24a is threaded on the bolt to provide fastening means securing the track shoe to the link. End portions 28 and 29 of sidewalls 14a and 15a, respectively, engage outboard sides of grousers 27 to aid in retaining the sidewalls in position on base 26. It should be noted that the first track shoe component comprising sidewalls 14a and 15a may be removed, if so desired, and the track assembly may be operated solely with base component 26 which is substantially configured to constitute a conventional track shoe.

FIGS. 6 and 7 illustrate a further modification 10b of the track assembly wherein identical numerals depict corresponding constructions, but with numerals depicting modified constructions in these figures being accompanied by a "b".

Endless track assembly 10b comprises a plurality of two-component track shoes 13b, including a first component forming a pair of diverging sidewalls 14b and 15b meeting at a common apex 16b. A second component or base 30, having a generally triangularly shaped cross section substantially conforming to the shape of integrated sidewalls 14b and 15b, is secured to the sidewalls by a plurality of fastening means or bolts 31. The track shoe thus comprises a double-walled construction to further increase the structural integrity and rigidity of the track shoe.

Base 30 comprises a pair of flanges 18b extending inwardly from sidewalls 14b and 15b and also from lugs 19b and 20b, formed at the terminations of the sidewalls. A plurality of bolts 22b extend through the flanges and through a bridging portion of track link 12 to secure the track shoe in place along with nuts 25b. An access hole 17b is formed through each sidewall of base 30 to facilitate securement of bolts 22b prior to securement of bolts 31 on each lateral end of the track shoe.

The embodiments of the invention in which an exclusive property or privilege is claimed are defined as follows:

1. An endless track assembly for a track-type vehicle comprising
    an articulated link assembly including a plurality of pivotally interconnected links,
    a track shoe releasably connected to each pair of laterally spaced links of said link assembly comprising
    a pair of sidewalls disposed in diverging relationship relative to each other and extending from an apex to a base of said track shoe,
    a lug disposed on each lateral side of said track shoe at the termination of each of said sidewalls at the base thereof and extending outwardly therefrom, and
    flange means disposed adjacent to each lug and extending inwardly therefrom and inwardly from a respective one of said sidewalls, and
    fastening means releasably securing said track shoe to each of said pair of links.

2. The endless track assembly of claim 1 wherein said track shoe constitutes a unitary construction having said flange means formed therefrom.

3. The endless track assembly of claim 2 wherein said flange means comprises a plurality of flanges formed integrally with the sidewalls of said track shoe.

4. The endless track assembly of claim 3 wherein said flanges are formed out of said sidewalls to each define an opening therein exposing said fastening means.

5. The endless track assembly of claim 3 wherein a pair of longitudinally spaced flanges are formed out of each of said sidewalls.

6. The endless track assembly of claim 2 wherein each of said lugs are formed integrally with the sidewalls of said track shoe.

7. The endless track assembly of claim 3 wherein said fastening means comprises a bolt extending through a respective one of said flanges and a bridging portion of a respective one of said pair of links of said link assembly.

8. The endless track assembly of claim 1 wherein said track shoe comprises first and second components and wherein said first component comprises said sidewalls and wherein said second component is secured to said first component.

9. The endless track assembly of claim 8 wherein said flange means comprises a plurality of flanges formed integrally with the sidewalls of said track shoe and defining openings in said sidewalls exposing said fastening means.

10. The endless track assembly of claim 9 wherein said flanges comprise a pair of longitudinally spaced flanges formed integrally with each of the sidewalls of said track shoe and wherein the second component of said track shoe is secured to a respective one of said pair of links by a said fastening means which extends through a said flange and through said second component.

11. The endless track assembly of claim 9 wherein the second component of said track shoe has a pair of laterally spaced grousers formed thereon and wherein said flanges are mounted on said grousers.

12. The endless track assembly of claim 11 wherein an end portion of each sidewall of the first component of said track shoe abuts an outboard side of a respective one of said grousers.

13. The endless track assembly of claim 8 wherein said lugs are formed integrally with the second component of said track shoe.

14. The endless track assembly of claim 8 wherein said flange means are formed integrally with one of the sidewalls and the second component of said track shoe.

15. The endless track assembly of claim 8 wherein the second component of said track shoe has a generally triangular cross section.

16. The endless track assembly of claim 14 wherein each of said fastening means extends through said flange means and is secured directly to a respective one of said pair of links.

17. The endless track assembly of claim 8 further comprising means defining an access opening through the second component of said track shoe exposing said fastening means.

18. The endless track assembly of claim 8 further comprising additional fastening means releasably securing the first and second components of said track shoe together.

19. The endless track assembly of claim 8 wherein said lugs are formed integrally on the first component of said track shoe.

20. A track shoe adapted for use in an endless track assembly comprising
    a pair of sidewalls disposed in diverging relationship relative to each other from an apex to a base of said track shoe,
    a lug disposed on each lateral side of said track shoe at the termination of each of said sidewalls and extending outwardly therefrom, and
    flange means disposed adjacent to each lug and extending inwardly therefrom and from a respective one of said sidewalls adapted to secure said track shoe to a link of an endless track assembly of a track-type vehicle.

21. The track shoe of claim 20 wherein said track shoe constitutes a unitary construction having said flange means formed therefrom.

22. The track shoe of claim 21 wherein said flange means comprises a plurality of flanges formed integrally with the sidewalls of said track shoe.

23. The track shoe of claim 22 wherein said flanges are formed out of said sidewalls to each define an opening therein exposing said fastening means.

24. The track shoe of claim 22 wherein a pair of longitudinally spaced flanges are formed out of each of said sidewalls.

25. The track shoe of claim 21 wherein each of said lugs are formed integrally with the sidewalls of said track shoe.

26. The track shoe of claim 20 wherein said track shoe comprises first and second components and wherein said first component overlies said second component and comprises said sidewalls.

27. The track shoe of claim 26 wherein said flange means comprises a plurality of flanges formed integrally with the sidewalls of said track shoe and defining openings in said sidewalls.

28. The track shoe of claim 27 wherein said flanges comprise a pair of longitudinally spaced flanges formed integrally with each of the sidewalls of said track shoe.

29. The track shoe of claim 27 wherein the second component of said track shoe has a pair of laterally spaced grousers formed thereon and wherein said flanges are mounted on said grousers.

30. The track shoe of claim 29 wherein an end portion of each sidewall of the first component of said track shoe abuts an outboard side of a respective one of said grousers.

31. The track shoe of claim 26 wherein said lugs are formed integrally with the second component of said track shoe.

32. The track shoe of claim 26 wherein said flange means are formed integrally with the sidewalls and the second component of said track shoe.

33. The track shoe of claim 26 wherein the second component of said track shoe has a generally triangular cross sections.

34. The track shoe of claim 26 further comprising means defining a plurality of access openings through the second component of said track shoe.

35. The track shoe of claim 26 further comprising fastening means releasably securing the first and second components of said track shoe together.

36. The track shoe of claim 26 wherein said lugs are formed integrally on the first component of said track shoe.

* * * * *